July 28, 1936.  S. B. STINE  2,049,336
STRAINER
Filed Oct. 25, 1934  3 Sheets-Sheet 1
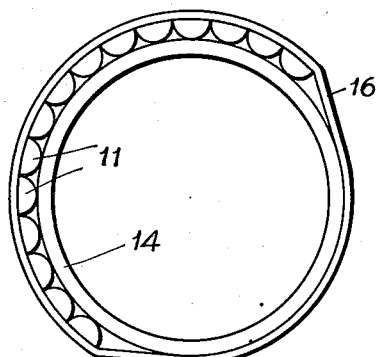
Fig. 1.
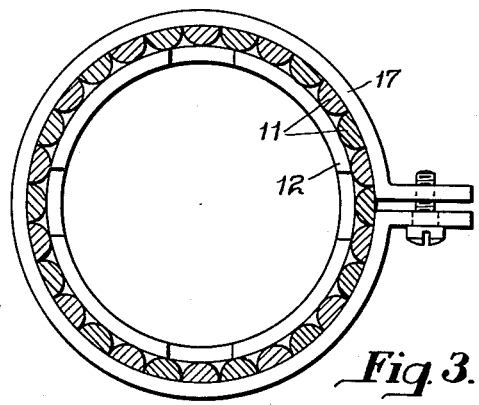
Fig. 3.
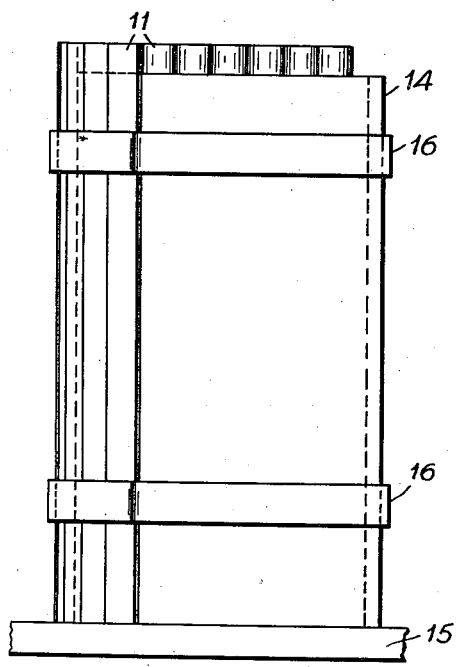
Fig. 2.
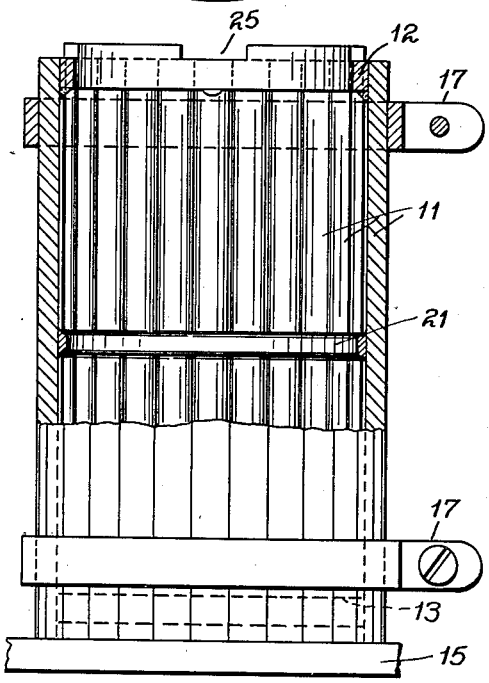
Fig. 4.
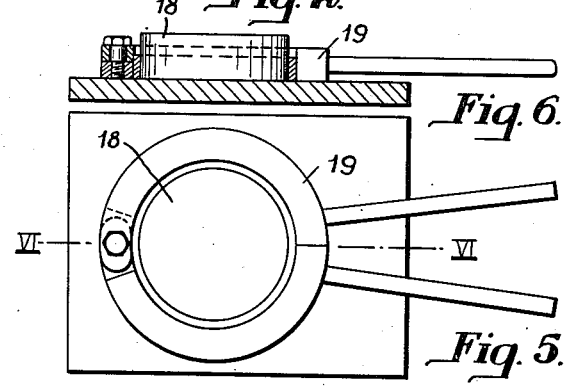
Fig. 6.
Fig. 5.
INVENTOR
Samuel Blaine Stine,
By Archworth Martin,
Attorney.

July 28, 1936.  S. B. STINE  2,049,336
STRAINER
Filed Oct. 25, 1934   3 Sheets-Sheet 3

INVENTOR
Samuel Blaine Stine,
By Archworth Martin,
Attorney.

Patented July 28, 1936

2,049,336

UNITED STATES PATENT OFFICE 2,049,336

STRAINER

Samuel Blaine Stine, Osceola Mills, Pa.

Application October 25, 1934, Serial No. 749,958

4 Claims. (Cl. 166—5)

My invention relates to strainers and is hereinafter described as employed in the making of well strainers, although it will be understood that the invention is applicable to strainers or screens for other purposes.

One object of my invention is to provide an improved means for assembling and securing strainer bars in unitary relation.

Another object of my invention is to provide strainers having openings of slit form, which can be produced with great accuracy and with a minimum amount of cutting or sawing.

Still another object of my invention is to provide a strainer of generally simplified and improved form, and one which is especially suited for use in the bearing sands of wells.

Figure 7:
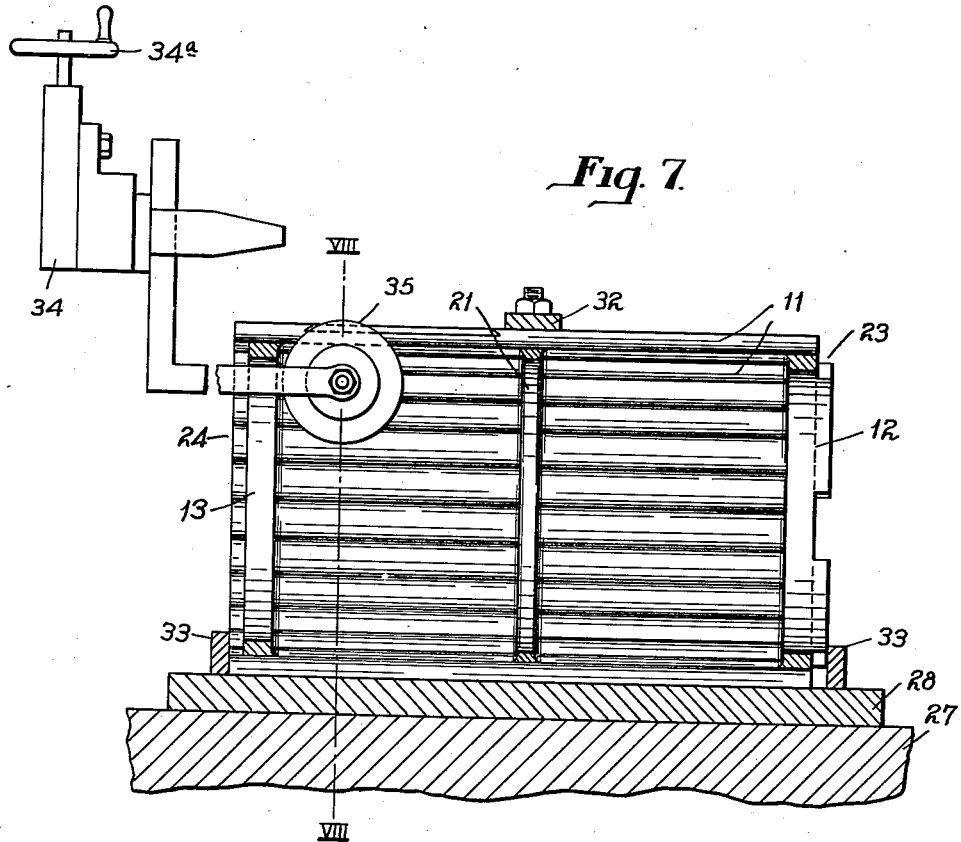
Figure 8:
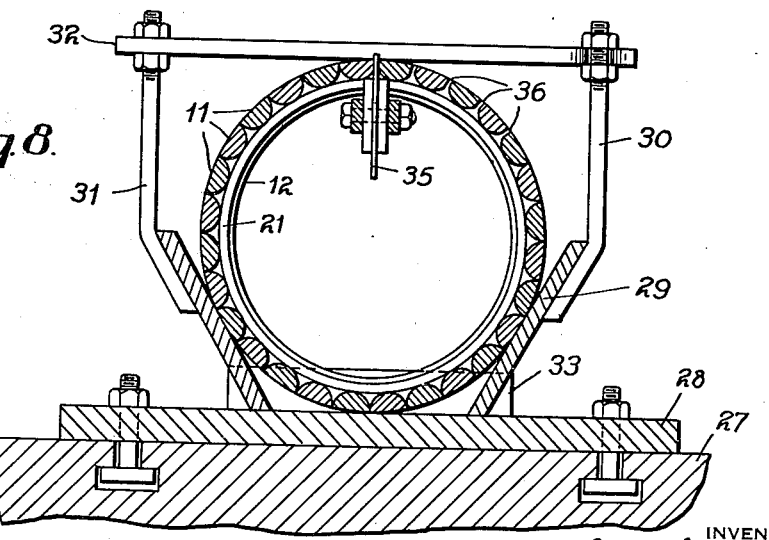
Figure 9:
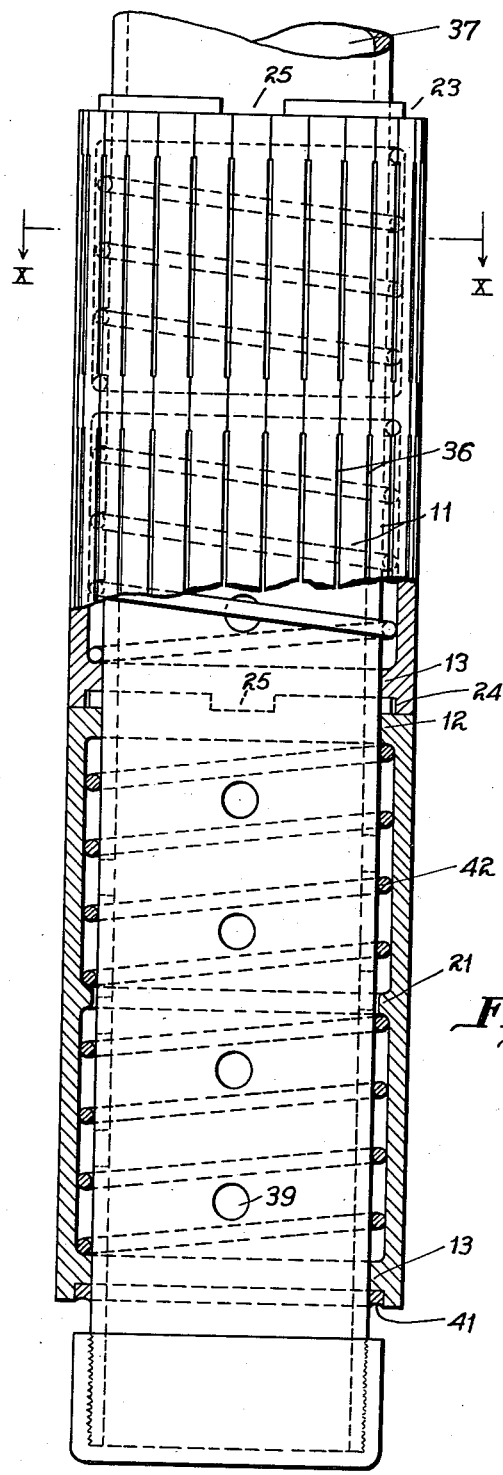
Figure 10:
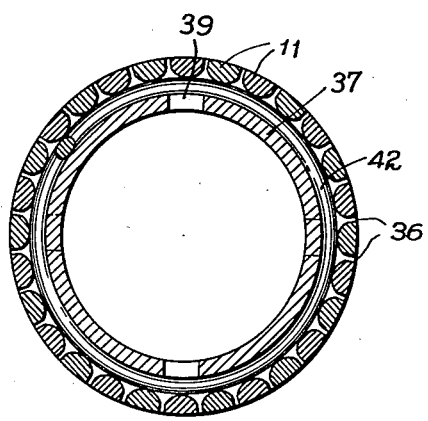

One manner in which my invention may be practised is shown in the accompanying drawings, wherein Figure 1 is a view showing the strainer at a preliminary stage of assembly; Fig. 2 is a side elevational view of the structure of Fig. 1; Fig. 3 shows a later stage in the operation of assembling the strainer; Fig. 4 is an elevational sectional view of the structure of Fig. 3; Fig. 5 is a plan view of a portion of the forming apparatus; Fig. 6 is a view taken on the line VI—VI of Fig. 5; Fig. 7 shows a manner in which the strainer openings are produced between the bars; Fig. 8 is a view taken on the line VIII—VIII of Fig. 7; Fig. 9 is a longitudinal sectional view of a completed strainer in position upon a well strainer casing, and Fig. 10 is a view taken out the line X—X of Fig. 9.

Referring first to Figs. 1 to 4, I show the manner in which bars that form the strainer elements proper are assembled and secured together in unitary relation. The strainer is shown as composed of bars 11 which may conveniently be of ⅜ inch half round bar stock or of any other suitable cross-sectional form. The bars 11 are disposed peripherally of and secured to rings 12 and 13 located near the tops and bottoms, respectively of the bars.

In assembling the structure, an internal form 14 is employed which may be a pipe of somewhat shorter length than the bars 11. The form 14 is placed upon a table 15, and rubber bands 16 placed around the form. The bars 11 are slipped into place, one-by-one, between the rubber bands and the form 14, as indicated in Figs. 1 and 2. The bands 16 serve as temporary holding members for the bars.

In case the bars 11 do not form a complete circle around the form 14, and a narrow space is left between the first and the last bars which are inserted in the rubber bands, I avoid the necessity of providing a narrow bar 11 to fill such space by inserting strips of paper between the various bars in order to fill the gap. The paper will burn out during the welding operation hereinafter referred to, and the radial shrinkage of the strainer after the bars have been welded to the rings 12 and 13 will draw the bars together with their edges in close-fitting engagement.

When the bars 11 all have been inserted, the ring 12 is inserted between the upper ends of the bars and against the upper end of the form 14, and the upper clamp 17 is applied around the bars and tightened. Thereupon, the form 14 is withdrawn and the ring 13 inserted between the bars at their lower ends. The clamps 17 are so tensioned that they will maintain the bars 11 and the rings 12 and 13 in proper relative positions, but will permit some shifting and alignment of the bars, so that the ends of the bars may be brought smartly into engagement with the table 15 to square them up.

The rings 12 and 13 may be formed in any suitable manner, or may simply constitute short sections cut from the end of a pipe. However, I prefer to make them of cold-rolled metal, the strips of metal being cut into proper width, heated, and placed around a die 18. Tongs 19 are then applied and given radial movement around the partially-formed ring to bring it to a set circular form and thereafter the ends of the strip can be welded to complete the forming of the ring.

After the bars and the rings have been trued up or squared as shown in Fig. 4, the bars 11 are arc-welded to the rings 12 and 13, to hold them securely in place during the completion of the welding operations. The clamps 17 may then be removed. An intermediate ring or strengthening rib 21 is secured in place by an arc-welding operation.

The final welding or brazing operation is then performed at the rings 12 and 13. This may be by an arc-welding method with the use of either brass or steel. I prefer to employ brass, which is deposited to a considerable depth and will enter the spaces behind the rings and between the bars 11. The cooling of the welding metal at 12, 13 and 21 draws the bars 11 into very snug engagement with one another along their longitudinal edges. The bars, by the use of the clamps 17 and the welding operations are held so snugly together that the lines of division between them are scarcely perceptible, and are usually watertight.

The strainer is then placed on a mandrel and a turning or grinding operation performed to smooth the exterior thereof. The ends of the bars are trimmed off to make them even, and the necessary cutting operations performed to produce male and female joints on the ends of the strainer as indicated at 23 and 24, in Fig. 9, the protruding ring 12 at the upper end of each strainer section being cut away at 25 for the reception of welding metal, as hereinafter explained. The strainer bars and rings may suitably be of an acid-resisting alloy, or can be given an acid-proof coating such as chromium plating, after the bars have been welded to the rings.

The strainer slots can then be formed. A convenient manner of effecting this operation is illustrated in Figs. 7 and 8, wherein the strainer is held by a clamp that is bolted to a shaper bed 27. The clamping device consists of a base plate 28 that carries a cradle 29 of generally V form. Bolt-like extensions 30 and 31 are secured to the cradle and at their upper ends carry a clamping bar 32. The clamping bar 32 is mounted for pivotal or swinging movement on the extension 31 and at its other end has a slot in its side that permits it to be swung horizontally into and out of engagement with the bolt 30. The nuts on the bolt 30 are so positioned that the clamping bar 32 will not too rigidly hold the pipe, and in order that the pipe may be conveniently given a slight rotative movement between each slitting or sawing operation, without removing the bar 32. End bars or blocks 33 are secured to the base 28 to prevent endwise shifting of the strainer.

With the strainer in the clamping device, a shaper 34 is set into operation for movement longitudinally of the strainer. The shaper carries a cutting disc or saw 35 which conveniently may be of the form shown in my Patent No. 1,963,425, issued June 19, 1934. The cutting disc or saw 35 is moved back and forth by the shaper along each slot to cut the same, primarily by the corners or edges of the disc 35 cutting away a small amount of metal at the edges of the bars 11. In this manner, slots 36 of the desired width are accurately formed, the walls in the slots being radially parallel for some distance as shown more clearly in Fig. 8, and then flared, due to the curved contour of the inner sides of the bars. The straight sides may extend radially for $\tfrac{1}{16}$ inch or more.

Upon each reciprocatory movement of the cutter disc 35, a hand wheel 34a on the shaper is turned to lower the shaper head and the cutting disc. The strainer may then be given a slight turn in its cradle to bring it in position for the cutting of another slot 36, whereupon the hand wheel 34a is turned in the reverse direction, to raise the disc to cutting position.

In case the disc 35 is of such size that it cannot open the slots sufficiently close to the rings 12, 13 and 21, without damaging the rings, the completion of the slotting operation can be performed with a small hand tool, as shown in my said patent, from exteriorly of the strainer.

Ordinarily, the strainers as shown in Figs. 1 to 8, are made in short lengths and a plurality of them employed in a well. Where the pressure is very great, the strainer is placed over a casing 37 that is commonly in the form of pipe having a suitable number of perforations 39, into which the liquid may flow and be pumped from the casing. Two or more of the strainer sections are placed on the casing 37 with their abutting ends interlocking as shown in Fig. 9. The strainers are necessarily of slightly greater internal diameter than the outside diameter of the casing, so that they can be readily applied to the casing. Therefore, there is some tendency for the strainer sections to tilt somewhat on the casing. This tendency to tilt is minimized, if not entirely overcome, by the inter-engagement of the strainer sections at their abutting ends, which engagement maintains them in proper relative alignment, and by reason of the combined length of the strainer sections, they are therefore held in approximately accurate alignment with the casing 37.

This alignment having been effected, the bottom strainer section is welded to the casing as indicated at 41. The upper end of the section may also be secured to the casing, by the deposit of welding metal in the pockets 25. The upper end of each superposed section will ordinarily be secured to the strainer casing by depositing welding metal in the pockets 25. Since the welding metal is contained within the pockets, it will not interfere with proper fitting of each superposed strainer section over the ring 12 of a lower section. The provision of the pockets for receiving the welding metal avoids the burning or damaging of chromium or other acid-resisting plating which may have been applied to the strainer.

In any event, the uppermost strainer section of a set is welded to the casing by metal deposited in the pockets 25. With the first strainer aligned with and welded to the pipe, as above-explained, the additional strainer sections will be automatically aligned on the casing as they are placed in position, because of the interfitting engagement at the ends of the strainer sections.

Before placing the strainer sections on the casing 37, spacer rings 42 that conveniently may be in the form of spirally-shaped wire are inserted between the rings 12, 31 and 13. These spacing elements serve to support the bars 11 against thrusting forces such as occur through contact with extraneous objects or the caving of the well, and thus prevent bending of the bars.

I claim as my invention:—

1. The combination with a strainer casing, of a strainer disposed circumferentially thereof, and provided with longitudinally-extending strainer bars secured to internal rings, and spacing elements interposed between the casing and the strainer bars at points between the said rings.

2. Strainer structure comprising ring members, bars welded to said ring members and arranged in cylindrical form, the one ring member projecting axially beyond the bars at one end of the strainer and provided with cut-out portions, and a strainer casing disposed within said ring members, and secured to the said one ring member by welding metal deposited in the said cut-out areas.

3. Strainer structure comprising ring members, bars welded to said ring members and arranged in cylindrical form, the one ring member projecting axially beyond the bars at one end of the strainer and provided with cut-out portions, and a strainer casing disposed within said ring members and secured to the said one ring member by welding metal deposited in the said cut-out areas, the opposite end of the strainer being recessed to permit interfitting engagement with the periphery of the projecting ring of a similarly-formed strainer.

4. Strainer structure comprising axially-spaced ring members, strainer bars extending axially of and disposed circumferentially of the ring members and welded thereto, the ring member at one end of the structure protruding beyond the ends of the bars, and the bars at the other end extending beyond the adjacent ring member, in position to overlie the protruding ring of another strainer section.

SAMUEL BLAINE STINE.